United States Patent [19]
Wild et al.

[11] Patent Number: 5,213,582
[45] Date of Patent: May 25, 1993

[54] LIGHT-POLARIZING FILMS OR FOILS CONTAINING TRIPHENDIOXAZINE OR TRIPHENDITHIAZINE DYES WITH GOOD DICHRDITIC PROPERTIES

[75] Inventors: Peter Wild, Odenthal; Uwe Claussen, Leverkusen; Friedrich W. Kröck, Bayerwerk, all of Fed. Rep. of Germany

[73] Assignee: Bayer Aktiengesellschaft, Leverkusen-Bayerwerk, Fed. Rep. of Germany

[21] Appl. No.: 849,793

[22] Filed: Mar. 11, 1992

Related U.S. Application Data

[63] Continuation of Ser. No. 633,003, Dec. 24, 1990, abandoned.

[30] Foreign Application Priority Data

Jan. 10, 1990 [DE] Fed. Rep. of Germany ....... 4000481

[51] Int. Cl.$^5$ .............. C08J 3/21; C08J 5/18; C09B 19/02; G02B 5/30
[52] U.S. Cl. .................... 8/506; 8/636; 544/14; 544/76
[58] Field of Search ............ 8/506; 544/14, 76

[56] References Cited

U.S. PATENT DOCUMENTS 3,883,523  5/1975  Parton ................. 260/246
4,231,918 11/1980  Babler ................. 524/84
4,591,643  5/1986  Jäger .................. 544/76
4,604,459  8/1986  Jäger .................. 544/76
4,874,857 10/1989  Harms ................. 244/75
4,876,342 10/1989  Pedrazzi .............. 544/14
4,990,615  2/1991  Henk et al. ........... 544/76
5,122,605  6/1992  Pedrazzi .............. 8/527

FOREIGN PATENT DOCUMENTS 0348964   3/1990  European Pat. Off. .
61-275703 12/1986  Japan .

Primary Examiner—A. Lionel Clingman
Attorney, Agent, or Firm—Connolly & Hutz

[57] ABSTRACT

Light-polarizing films or foils, preferably based on a vinyl alcohol homopolymer or copolymer, contain dyes corresponding to the following formula

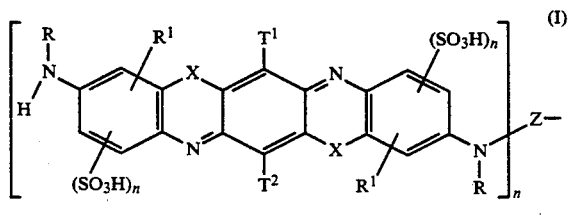

in which R, $R^1$, $T^1$, $T^2$, n, X and Z are as defined in the specification.

5 Claims, No Drawings

LIGHT-POLARIZING FILMS OR FOILS CONTAINING TRIPHENDIOXAZINE OR TRIPHENDITHIAZINE DYES WITH GOOD DICHRDITIC PROPERTIES

This application is a continuation of application Ser. No. 07/633,003 filed Dec. 24, 1990, now abandoned.

This invention relates to light-polarizing films or foils containing triphendioxazine or triphendithiazine dyes.

Films based on polyvinyl alcohol containing iodine or dichroic dyes as polarizing agents are known.

Hitherto, iodine-containing polarizers have mainly been used in practice, for example in passive liquid crystal displays for displaying information. In the absence of moisture, these polarizers are characterized by excellent light stability and by excellent dichroic properties in the long-wave region of the visible spectrum. The active agent of these films is the iodine/polyvinyl alcohol complex (M. M. Zwick, J. Appl. Polym. Sci.; 9, 2393–2424 (1965)) which absorbs daylight over a wide band, but not completely. In the short-wave region, there is a "hole", i.e. an area of reduced extinction, so that the films are blue in color.

This has unfortunate consequences when it is desired to produced white light. The unpolarized light let through reduces the dichroism and, hence, the polarizing power in this region. To increase it again, the concentration of iodine complex has to be increased. However, this correction in the short-wave region results in excessive extinction in the long-wave region. This in turn results in a distinct reduction in the light let through in the pass position together with a reduction in the lightness of the display equipped with this film. To achieve acceptable lightness, compromises have to be reached.

An important critical parameter of a display is its readability under different illumination conditions which is normally referred to as the "perceived contrast ratio" (PCR $=T_{195}/T_{81}$). It follows from this that the transmission on the one hand must be made as low as possible in the stop position ($T_\parallel$) (readability in darkness) and, on the other hand, as high as possible in the pass position ($T_{195}$) (readability in lightness). This requires completely uniform polarizing power on the part of the filter over the entire spectral region which, in principle, cannot be achieved with the iodine film.

There has been no shortage of attempts to replace iodine by dye triples of dichroic dyes to produce a neutral gray with uniform dichroism.

However, a range of very effective dyes is needed for this purpose. In addition to good light and weather fastness values, they must have high extinction and high dichorism in the matrix. In addition, they must not have any secondary densities of lower dichroism. Thus, among the dyes which have been proposed, preference is attributed to polyazo dyes, for example based on 4-nitro-4'-aminoflavonic acid (JA 59-145255, 60-156759, 60-168743) or substituted benzidine (JA 61 255 304). Many individual direct dyes have also mentioned, including for example Direct Red 2, 31, 781, Direct Orange 26, 107, Direct Green 85, Direct Blue 1, 202, Direct Black 17, 19, Direct Yellow 12, 44 etc. (GB 2,033,301, JA 60-230 606, JA 60-159 705, EP 182 632). The dyes mentioned mainly emanate from the azo series. However, dyes of the (mononuclear) triphendioxazine series have also been mentioned, including for example Direct Blue 106, 107, 109, 190 (JA 61-275 703), but unfortunately they show only moderate dichroism. Although dichroism is a widespread property among the dyes (cf. W. Hanle, H. Scherer, Zeitschr. Naturforsch. 6a 437–439 (1951)), it has not hitherto been possible to achieve or surpass the spectral properties of the iodine film. This is attributable on the one hand to the absence of good blue shades and on the other hand, to the need for high dichroism of the dye/ matrix system.

It has now surprisingly been found that binuclear triphendioxazine or triphendithiazine dyes have excellent dichroic properties and are eminently suitable for the production of light-polarizing films or foils. (A definition of a substituent or index, once given in the following, will apply through the text).

The present invention relates to light-polarizing films or foils containing dyes which, in the form of the free acid, correspond to the following formula

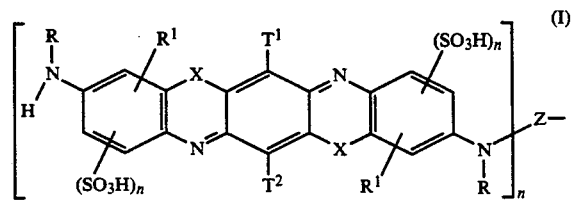

in which
R $=$H, optionally substituted $C_{1-4}$ alkyl, optionally substituted phenyl,
$R^1$ $=$H, substituent
$T^1$, $T^2$ $=$H, Cl, Br, optionally substituted $C_{1-4}$alkyl, $C_{1-4}$ alkoxy, phenyl, phenoxy
n $=$1, 2
Z $=$bridge member
X $=$oxygen or sulfur.

Examples of R include —H, —CH$_3$, —C$_2$H$_5$, n—C$_3$H$_7$, i—C$_3$H$_7$, n—C$_4$H$_9$, i—C$_4$H$_5$, which may be substituted, for example, by —OH, —OCH$_3$, —OC$_2$H$_5$, —COOH, —SO$_3$H. —O—SO$_3$H, —CN, —Cl.

Suitable substitutents $R^1$ are —CH$_3$, —C$_2$H$_5$, —Cl, —OCH$_3$, —OC$_2$H$_5$, —COOH.

Substituents of the optionally substituted $C_{1-4}$ alkyl and $C_{1-4}$ alkoxy radicals $T^1$ and $T^2$ are, for example, —OCH$_3$, OC$_2$H$_5$, —O—SO$_3$H.

Substituents of the optionally substituted phenyl and phenoxy radicals R, $T^1$ and $T^2$ are, for example, —Cl, —Br, —CH$_3$, —C$_2$H$_5$, —OCH$_3$, —OC$_2$H$_5$.

Suitable bridge members Z are, for example, —CO— and residues of aliphatic conjugated, aromatic carbocyclic or aromatic heterocyclic dicarboxylic acids and also the cyanuric chloride reside.

The following are examples of Z:

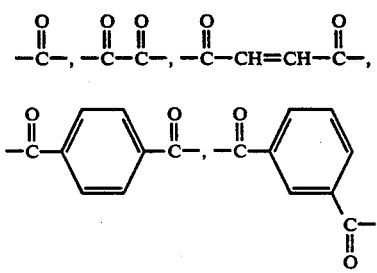

-continued

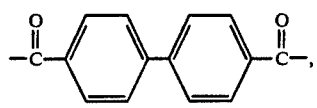

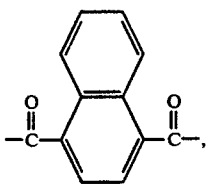

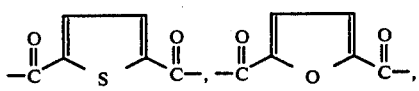

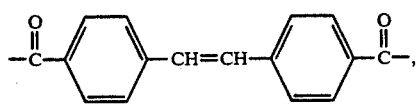

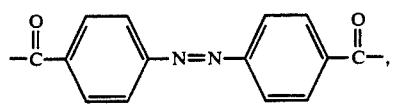

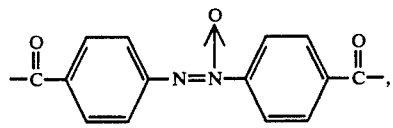

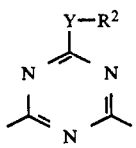

in which $R^2$ is an alkyl or aryl radical which may optionally be further substituted (suitable alkyl radicals are, for example, those mentioned for R while suitable aryl radicals are, in particular, phenyl radicals substituted by Cl, Br, $CH_3$, $C_2H_5$, $OCH_3$, $OC_2H_5$ or $SO_3H$ and Y is O or NH.

Preferred dyes are those in which X = O.

Particularly preferred dyes are dyes of formula (I) in which

R = H, $R^1$ = H, $T^1T^2$ = Cl, n = 1,

X = —O— and

Z = is as defined above and, more particularly, represents —CO—.

The dyes corresponding to formula I are obtained, for example, by reacting a triphendioxazine or triphendithiazine dye corresponding to the formula

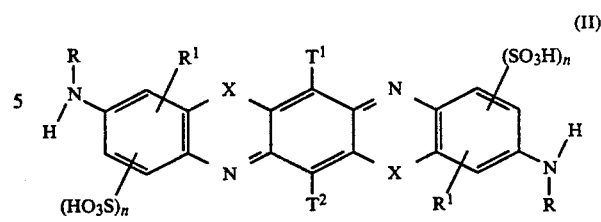

with phosgene or oxalyl chloride or with the dihalides of aliphatic conjugated, aromatic carbocyclic or aromatic heterocyclic dicarboxylic acids or with cyanuric chloride in a molar ratio of 2:1 with elimination of 2 mol hydrohalic acid; where cyanuric chloride is used, the third chlorine atom is subsequently exchanged by treatment with an excess of H—Y—$R^2$ at elevated temperature.

The reaction is preferably carried out in the presence of equivalent quantities of basic compounds, preferably alkali metal or alkaline earth metal hydroxides, oxides, carbonates or hydrogen carbonates or tertiary organic nitrogen bases, more particularly aliphatic amines, such as trialkanolamines, dialkyl alkanolamines or alkyl dialkanolamines, or aromatic nitrogen bases, such as pyridine, picolines and quinoline.

Suitable basic compounds are, for example, Li, Na, K, Mg or Ca hydroxides, oxides, carbonates or hydrogen carbonates, triethanolamine, methyl diethanolamine, dimethyl ethanolamine and reaction products of ammonia with more than 3 mol ethylene oxide or propylene oxide.

Dyes corresponding to formula (I) in which Z is the residue of a diarylazo or diarylazoxy dicarboxylic acid may be prepared as follows: (II) is first acylated with a nitroaryl carboxylic acid halide in a molar ratio of 1:1 and the resulting product is reduced by methods known per se, for example with sugar.

The starting compounds (II), including in particular those mentioned in the Examples, are known (cf. for example DE-A 21 24 08(corresponding to U.S. Pat. No. 3,883,523) Example 1; DE-A 34 23 58(corresponding to U.S. Pat. No. 4,604,459) Examples 1a and 1b) or may be produced by the processes described therein.

Particularly suitable dyes are those obtained from the intermediate product IIa

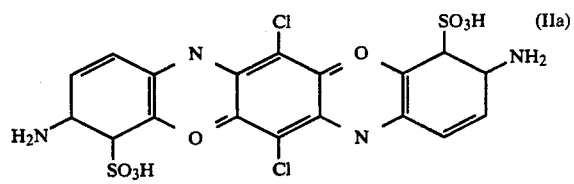

by reaction with the following acid halides:

| Acid halide | λmax of the dyes I from IIa |
|---|---|
| Cl—CO—Cl | 601 |
| Cl—CO—CH=CH—CO—Cl | 594 |
| Cl—CO—⟨phenyl⟩—CO—Cl | 590 |
| Cl—CO—⟨biphenyl⟩—CO—Cl | 590 |

| Acid halide | λmax of the dyes I from IIa |
|---|---|
| Cl—CO—[thiophene]—CO—Cl | |
| Cl—CO—[furan]—CO—Cl | |
| Cl—CO—[phenyl]—CH=CH—[phenyl]—CO—Cl | 592 |

More particularly, the invention relates to light-polarizing films (foils) containing an organic polymer and one or more compounds corresponding to formula (I).

The organic polymer is preferably an oriented polymer capable of forming transparent films which is compatible with dyes containing acidic groups. Examples of such polymers are polyamides, cellulose (acetate), vinyl alcohol homopolymers and copolymers and vinyl acetate homopolymers and copolymers; the monomers present may be, for example, ethylene, propylene, crotonic acid, (meth)acrylic acid, maleic acid. It is preferred to use polyvinyl alcohols which have been obtained by complete or partial saponification of polyvinyl acetate, more particularly types which have a viscosity of >4 mPa.sec. and preferably from 35 to 70 mPa.sec., as measured on a 4% aqueous solution at 20° C., and a degree of saponification of >80 mol-% and preferably from 85 to 100 mol-%.

The films preferably have a thickness of 10 to 150 82.

The films preferably contain 0.01 to 10% by weight and more preferably 0.5 to 6% by weight, based on the weight of the film, of dye.

The films are colored in the usual way, for example by coloring the dissolved polymer (dissolved in water). The film is prepared from the solution by methods known per se.

It is advisable to free the dyes or dye salts from foreign salts before they are used, for example by recrystallization, extraction and/or dialysis.

Films which have been uniaxially stretched by 200 to 1,000% at elevated temperature, preferably at 80 to 160° C., are preferably used.

If, desired, the dye-containing films may even be subjected to an aftertreatment, for example with aqueous boric acid solution, to improve their permeability to light or their polarization coefficient. The conditions under which this aftertreatment is carried out may vary according to the film material and the dye. The aftertreatment is preferably carried out with a 1 to 15% by weight and, more preferably, 5 to 10% by weight boric acid solution at 30 to 80 C and more preferably at 50 to 80° C. Surfactants and, optionally, inorganic salts are preferably added to the boric acid solution. The surfactants may be nonionic, cationic or anionic and are preferably nonionic.

Examples of nonionic surfactants are addition products of ethylene oxide with higher alcohols or addition products of ethylene oxide with nonylphenol. The surfactant is preferably used in a quantity of 0.005 to 0.5% by weight and more preferably in a quantity of 0.02 to 0.2% by weight, based on water. Preferred inorganic salts are sodium sulfate and also potassium sulfate, sodium chloride, potassium chloride, sodium nitrate, potassium nitrate. The inorganic salts are preferably used in a quantity of 0.1 to 5% by weight and more preferably in a quantity of 0.3 to 3% by weight. If desired, a fixing treatment may also be carried out using an aqueous solution of a high molecular weight cationic compound.

The dichroism of the system may be considerably increased by additions of lower polyhydric alcohols, such as glycol, glycerol, trimethylol ethane, trimethylol propane, pentaerythritol, sorbitol, ethers thereof, such as glycol monomethyl ether, glycol monoethyl ether, glycol dimethyl ether, diglycol diethyl ether, lower amines, such as propylamine, and hydroxyamines, such as propanolamine, or amides, such as DMF, N-methyl pyrrolidone, pyrrolidone, ε-caprolactam, to the casting solution. The additives may be used individually or, with greater advantage, in the form of mixtures with one another in which lower monohydric alcohols, for example methanol, ethanol, i-propanol, may also be present as constituents.

The additives are preferably introduced into the casting solution in quantities of 0.5 to 10% by weight, based on the casting solution.

Surface-active compounds may be additionally introduced to control surface tension and viscosity. Suitable surface-active compounds are, for example, sulfonic acids, such as alkane sulfonic acids, more particularly sulfo-succinic acid octyl ester, perfluoroalkane sulfonic acids, more particularly perfluorooctane sulfonic acid and its tetraalkyl ammonium salt, for example its tetraethyl ammonium salt, sulfates, more particularly sulfatized alkylphenol polyglycol ether, or alkyl sulfonates, amphoteric surfactants, more particularly alkane amidopropyl betaines, for example lauramidopropyl betaine, or the compounds listed in Chemical Abstracts under the following registry numbers: 73772-45-9, 96565-37-6, 4292-10-8, 59272-84-3, 25729-05-9, 6179-44-8, 21244-99-5, 58793-79-6, 32954-43-1, 92836-76-5, or nonionic surfactants, such as 4-octylphenol polyglycol ether.

The light-polarizing films or foils may be compounded or laminated with other materials by methods known per se. Suitable protective coatings are, for example, films of a tetrafluoroethylene/hexafluoroethylene copolymer or any other fluorocarbon resin, a polyester, polyolefin or polyamide resin, a polycarbonate or cellulose ester, preferably (tri)acetate, propionate or butyrate.

In addition to their use in light-polarizing films, the dyes corresponding to formula I may be used individually or in admixture for showing up ordered structures in the analysis of polymers and in biological materials.

EXAMPLE a) 0.1 G OF THE DYE

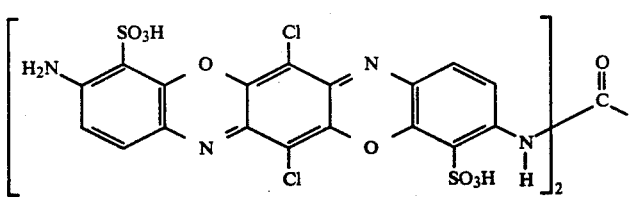

free from salts and diluents is dissolved with stirring at 80° C. in 190 g demineralized water and 9.9 g MOWIOL 28-29 (saponified polyvinyl acetate; degree of saponification 99.4 ±0.4 mol-%; viscosity of a 4% aqueous solution at 20° C =28 ±2.0 mPa.sec.; a product of Hoechst) are dissolved in the resulting solution, after which 2.5 g glycerol and 5.0 g methanol are added to 92.5 g of the solution.

The resulting casting solution is knife-coated onto a clean glass plate in a layer thickness of 500 μ. After drying at room temperature, the film thus obtained is removed from the substrate, heated for 15 minutes at 130° C. and then monoaxially stretched to approximately 700% of its original length at that temperature at a rate of 10 cm/min.

The film shows a dichroic ratio (QE) of 18.8 in the extinction maximum at 630 nm, as measured with polarized light, and a maximum QE of 21.1 at 650 nm.

b) FILM PRODUCTION BY CASTING MACHINE 0.2 g of the above dye free from salts and diluents is dissolved in 100 g hot water. 10 g glycerol are then added and 19.8 g MOWIOL ®28-99 are introduced into the cooled solution with stirring. After stirring for 1 hour at room temperature, the solution is heated to 90° C. and stirred at that temperature until it is homogeneous (approx. 3 hours). 5 g methanol are then stirred in at 50° C. The warm solution is filtered through a filter press where air is introduced under pressure and then degassed in an ultrasonic bath. The casting solution can be cast and stored at 30° C.

To produce a film, the casting solution is continuously applied by a 250 μ knife onto the casting drum preheated to approx. 50° C. (drum diameter 25 cm, rotational speed approx. 7.5 r.p.m.). The layer is dried by passing over a stream of heated air and the solidified film is continuously removed from the drum and dried. The film obtained is approximately 40 μ thick. It is stretched as described above, very similar results being obtained.

c) PREPARATION OF THE DYE

110 Parts of the triphendioxazine dye

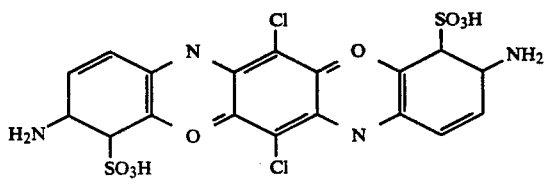

are dissolved in approx. 4 liters water to form a neutral solution. Approx. 400 parts phosgene are then introduced over a period of several hours with vigorous stirring at room temperature. At the same time, the pH value of the reaction mixture is kept neutral by addition of a lithium hydroxide solution. To terminate the reaction, it is best to increase the temperature to around 80° C.

On completion of the reaction, the dye precipitated after cooling to room temperature is filtered off and is freed from salts by ultrafiltration and recrystallization from water and then dried.

We claim:
1. Light-polarizing films or foils comprising:
   i) an organic polymer component comprising polyvinyl alcohols obtained by the complete or partial saponification of polyvinyl acetate; and
   ii) at least one dye which, in the form of the free acid, corresponds to the formula:

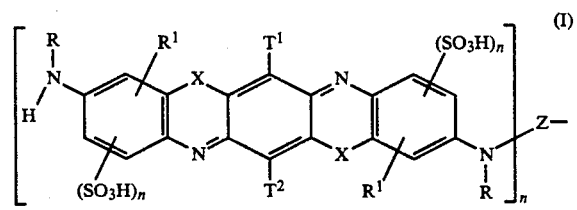

wherein R represents H, $C_{1-4}$ alkyl optionally substituted with —OH, —OCH$_3$, —OC$_2$H$_5$, —COOH, —SO$_3$H, —CN or Cl, or phenyl optionally substituted with —Cl, —Br, —CH$_3$, —C$_2$H$_5$, —OCH$_3$, or —OC$_2$H$_5$;

$R^1$ represents H, —CH$_3$, —C$_2$H$_5$, —Cl, —OCH$_3$, —OC$_2$H$_5$, or —COOH;

$T^1$ and $T^2$ represent H, Cl, Br, or optionally substituted $C_{1-4}$ alkyl, $C_{1-4}$ alkoxy, phenoxy, or phenyl, the optional substituents being selected from —Cl, —Br, —CH$_3$, —C$_2$H$_5$, —OCH$_3$, or —OC$_2$H$_5$;

n is the integer 1 or 2;

Z represents a bridge member selected from —CO—, residues or aliphatic conjugated, aromatic carbocyclic or aromatic heterocyclic dicarboxylic acids, or cyanuric chloride residue; and X represents oxygen or sulfur.

2. Films or foils as claimed in claim 1 where X represents oxygen, R and $R^1$ represent H, $T^1$ and $T^2$ represent Cl, and n is 1.

3. Films or foils as claimed in claim 1 wherein Z represents —CO—.

4. Films or foils as claimed in claim 2 wherein Z represents —CO—.

5. The films or foils as claimed in claim 1 wherein the polyvinyl alcohols have a viscosity of greater than 4 mPa.sec and a degree of saponification of greater than 80 mol-%.

* * * * *